(12) United States Patent
Tong et al.

(10) Patent No.: US 12,243,295 B2
(45) Date of Patent: Mar. 4, 2025

(54) ROBUST NEURAL NETWORK LEARNING SYSTEM

(71) Applicant: GM Global Technology Operations LLC, Detroit, MI (US)

(72) Inventors: Wei Tong, Troy, MI (US); Jacob Alan Bond, Rochester Hills, MI (US); Siddhartha Gupta, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 361 days.

(21) Appl. No.: 17/709,553

(22) Filed: Mar. 31, 2022

(65) Prior Publication Data

US 2023/0316728 A1 Oct. 5, 2023

(51) Int. Cl.
*G06V 10/774* (2022.01)
*G06N 3/08* (2023.01)
*G06V 10/82* (2022.01)

(52) U.S. Cl.
CPC .......... *G06V 10/7747* (2022.01); *G06N 3/08* (2013.01); *G06V 10/82* (2022.01)

(58) Field of Classification Search
CPC ...... G06V 10/7747; G06V 10/82; G06N 3/08; G06N 3/09; G06N 3/094; G06N 3/063
See application file for complete search history.

(56) References Cited

U.S. PATENT DOCUMENTS

| | | | |
|---|---|---|---|
| 11,927,967 B2 * | 3/2024 | Jain | G05D 1/0088 |
| 2018/0032082 A1 * | 2/2018 | Shalev-Shwartz | |
| | | | B60W 30/18163 |
| 2019/0180115 A1 * | 6/2019 | Zou | G06V 20/588 |
| 2020/0167941 A1 * | 5/2020 | Tong | G01S 13/89 |
| 2020/0192391 A1 * | 6/2020 | Vora | G08G 1/16 |
| 2020/0231109 A1 * | 7/2020 | Baltaxe | G06N 3/08 |
| 2020/0311481 A1 * | 10/2020 | Tong | G06V 10/774 |
| 2021/0271259 A1 * | 9/2021 | Karpathy | G06N 3/045 |
| 2022/0108213 A1 * | 4/2022 | Cao | G06N 3/045 |
| 2022/0156892 A1 * | 5/2022 | Slutsky | G06N 3/08 |
| 2023/0202511 A1 * | 6/2023 | Atsmon | G06N 3/09 |
| | | | 701/23 |

* cited by examiner

*Primary Examiner* — Xuemei G Chen
(74) *Attorney, Agent, or Firm* — Vivacqua Crane, PLLC (57) ABSTRACT

A system comprises a computer including a processor and a memory. The memory includes instructions such that the processor is programmed to: receive intermediate concept constraints at a neural network and train the neural network with training data, training labels, and the at least one of the data constraint, the feature constraint, or the intermediate concept constraint.

16 Claims, 7 Drawing Sheets

ROBUST NEURAL NETWORK LEARNING SYSTEM

INTRODUCTION

The present disclosure relates to a robust neural network learning system that uses intermediate concept constraints and inferencing during training.

Deep neural networks (DNNs) can be used to perform many image understanding tasks, including classification, segmentation, and captioning. Typically, DNNs require large amounts of training images (tens of thousands to millions). Additionally, these training images typically need to be annotated, e.g., labeled, for the purposes of training and prediction.

Additionally, conventional DNNs can be susceptible to adversarial attacks. For example, conventional DNNs may be vulnerable to adversarial attacks in which noisy input causes the DNNs to behave abnormally, such as generating inaccurate predictions and/or classifications.

SUMMARY

A system comprises a computer including a processor and a memory. The memory includes instructions such that the processor is programmed to: receive intermediate concept constraints at a neural network and train the neural network with training data, training labels, and the at least one of the data constraint, the feature constraint, or the intermediate concept constraint.

In other features, the neural network is trained using the intermediate concept constraint, the intermediate concept constraint comprising at least one concept parameter that defines an individual component and relational information pertaining to an object of interest.

In other features, the neural network is trained using the data constraint, wherein the data constraint comprises perturbed data such that the neural network is trained to identify adversarial features.

In other features, the neural network is trained using the feature constraint, wherein the feature constraint comprises style parameters corresponding to the input data.

In other features, the feature constraint comprises at least one of intrinsic image parameters corresponding to sensor data, extrinsic image parameters corresponding to the sensor data, or physical sensor properties of a sensor that captures the sensor data.

In other features, the processor is further programmed to receive the training data and the training labels.

In other features, the training data comprises images depicting an object within a field-of-view of a vehicle sensor.

In other features, the neural network comprises a deep neural network.

In other features, the deep neural network comprises at least one of a convolutional neural network or a generative adversarial neural network.

In other features, the neural network is trained with at least two of the data constraint, the feature constraint, or the intermediate concept constraint.

A method includes receiving intermediate concept constraints at a neural network and training the neural network with training data, training labels, and the at least one of the data constraint, the feature constraint, or the intermediate concept constraint.

In other features, the method includes training the neural network using the intermediate concept constraint, the intermediate concept constraint comprising at least one concept parameter that defines an individual component and relational information pertaining to an object of interest.

In other features, the method includes training the neural network using the data constraint, wherein the data constraint comprises perturbed data such that the neural network is trained to identify adversarial features.

In other features, the method includes training the neural network using the feature constraint, wherein the feature constraint comprises style parameters corresponding to the input data.

In other features, the feature constraint comprises at least one of intrinsic image parameters corresponding to sensor data, extrinsic image parameters corresponding to the sensor data, or physical sensor properties of a sensor that captures the sensor data.

In other features, the method includes receiving the training data and the training labels.

In other features, the training data comprises images depicting an object within a field-of-view of a vehicle sensor.

In other features, the neural network comprises a deep neural network.

In other features, the deep neural network comprises at least one of a convolutional neural network or a generative adversarial neural network.

In other features, the method includes training the neural network with at least two of the data constraint, the feature constraint, or the intermediate concept constraint.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure discloses one or more implementations of a data and knowledge-driven learning architecture. As discussed herein, the neural networks can be trained using conventional training data in addition to intermediate concept constraints. The intermediate concept constraints can be based on human knowledge that provide additional context about the training data. For example, the intermediate concept constraints can comprise additional definitions and/or relationships pertaining to the objects depicted within the training data. In training neural networks with intermediate concept constraints, trained neural networks can be resistant to adversarial attacks, unaffected by domain changes, generalized to unlikely situations, and explainable.

Figure 1:
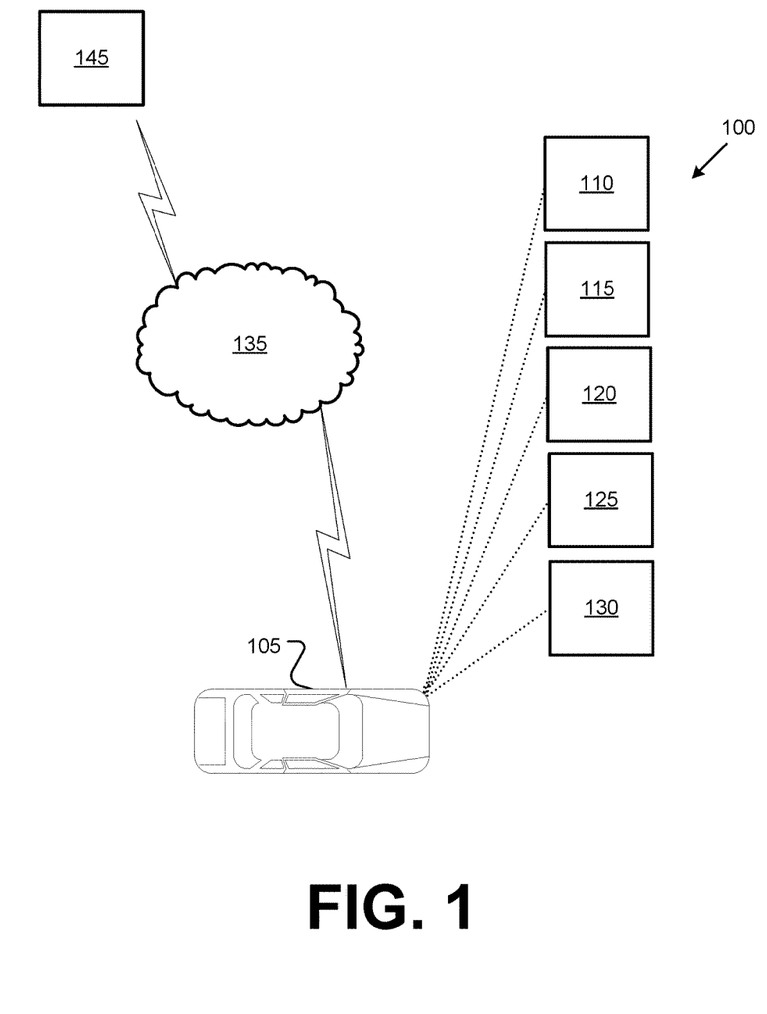
FIG. 1 is a block diagram of an example system including a vehicle.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN)

and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
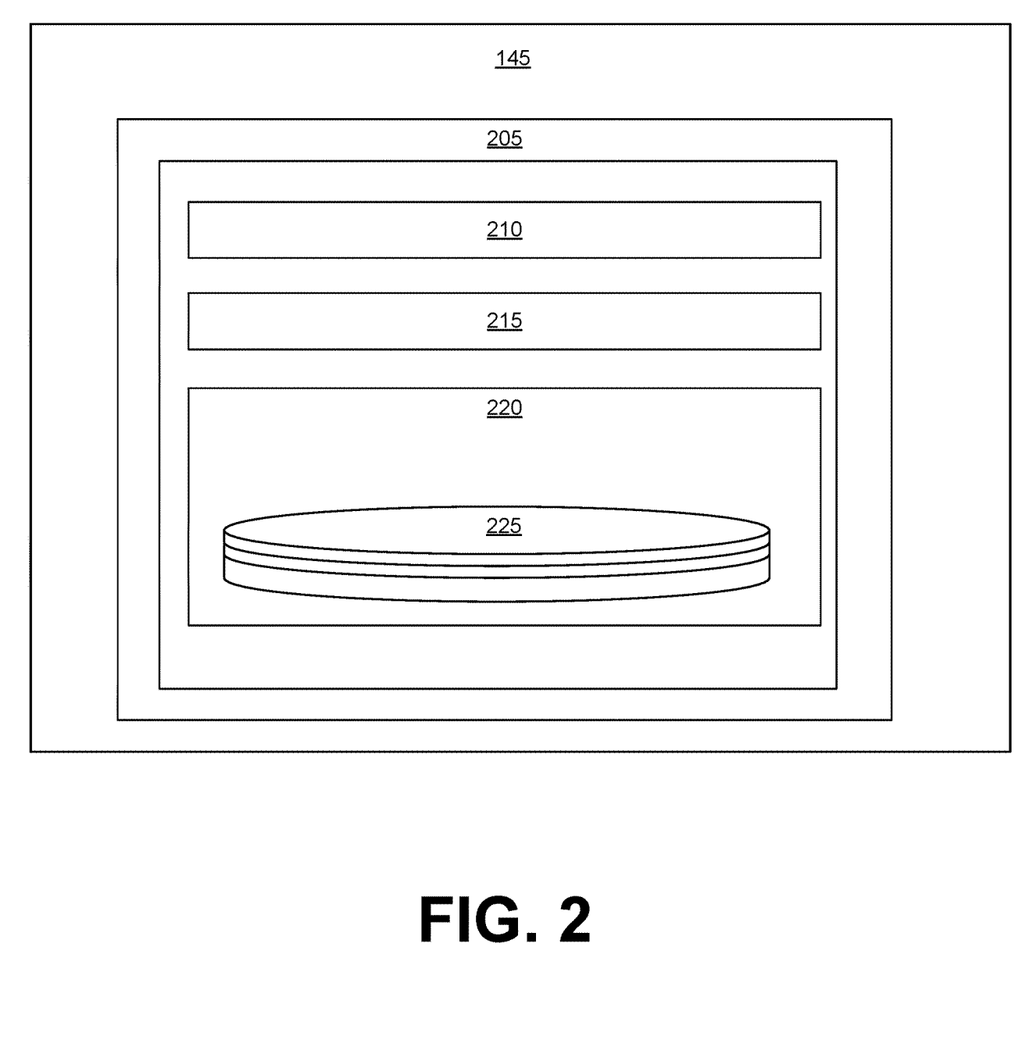
FIG. 2 is a block diagram of an example server within the system.

FIG. 2 illustrates an example server 145 that includes a data and knowledge neural-network training system 205. As shown, the data and knowledge neural network training system 205 may include a neural network module 210, a neural network training module 215, and a storage module 220.

As just mentioned, the data and knowledge neural network training system 205 can include a neural network module 210. In particular, the neural network module 210 can manage, maintain, train, implement, utilize, or communicate with one or more neural networks. For example, the neural network module 210 can communicate with the storage module 220 to access a neural network, e.g., neural network 400, stored within the database 225. In addition, the data and knowledge neural network training system 205 training system 205 can communicate with the neural network training module 215 to train and implement a neural network to classify digital images or generate predictions for other possible domains.

As described in greater detail herein, the neural network training module 215 can train and implement a neural network using training data and at least one of a data constraint, a feature constraint, or an intermediate concept constraint.

An intermediate concept constraint can comprise one or more concept parameters. The concept parameters can comprise an indication conveying a concept to be learned from the one or more digital media items, i.e., a digital image, a digital audio file, etc. A concept may refer to a sentiment, an adjective, a verb, a noun, an abstract notion, a concrete notion, and/or any other information that can be learned. In some instances, the concept may comprise human-provided knowledge pertaining to an object of interest.

For example, the concept of a "vehicle" may be learned from one or more images of a vehicle, from one or more descriptions of a vehicle, and/or from other information related to vehicles. For instance, the concept parameters can include wheels, vehicle body, doors, windows, vehicle color, etc., that provide concrete notions, e.g., physical characteristics, of the vehicle. In an example implementation, training data and training labels may be provided to train the neural network to encode features corresponding to individual concepts, i.e., details and relative positional information, of a vehicle, such as doors, location of the doors, wheels, location of the wheels, windows, location of the windows, and so forth. In other words, the intermediate concept constraint can be used to train the neural network to recognize vehicles based on derived structured concepts obtained from the images and concept representations, i.e., individual components of the vehicle 105 and the relationship between these components.

The data constraint, or perturbed data constraint, may comprise perturbed data, i.e., adversarial data, such that the neural networks "learn" transformation invariance concepts present in human perception. Within this context, the neural network can be trained to identify adversarial features introduced into sensor data and disregard the adversarial features for the purposes of classification and/or detection.

The feature constraint may comprise style parameters corresponding to the input data. For example, the feature constraint may comprise physical parameters, such as intrinsic image parameters corresponding to the sensor data, extrinsic image parameters corresponding to the sensor data, and/or physical sensor properties of the sensor 115 that generated the sensor data, such as physical properties of the sensor such as lens type, sensor hardware, etc.

Using at least one of the data constraint, the feature constraint, or the intermediate concept constraint, the neural network training module 215 can determine gradient losses associated with classification labels for a number of neurons within the neural network.

Figure 3:
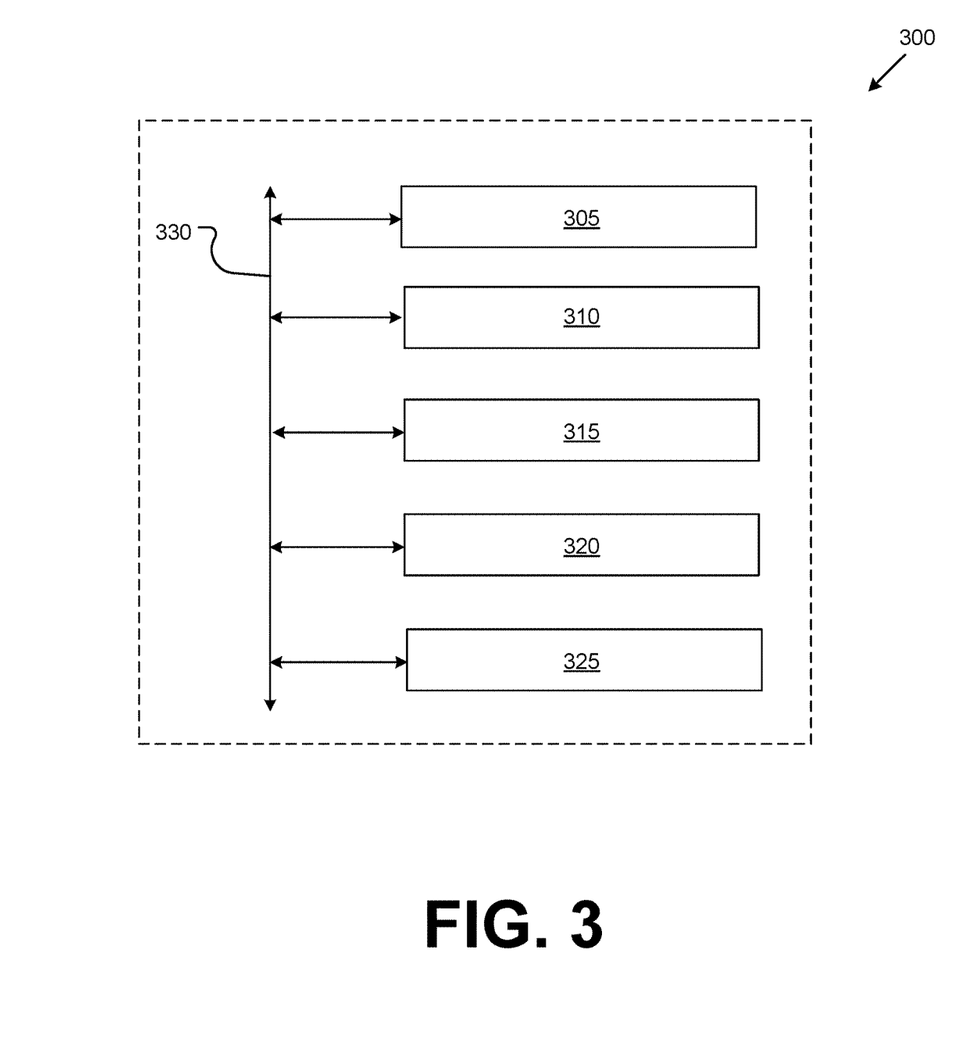
FIG. 3 is a block diagram of an example computing device.

FIG. 3 illustrates an example computing device 300 i.e., computer 110 and/or server(s) 145 that may be configured to perform one or more of the processes described herein. As shown, the computing device can comprise a processor 305, memory 310, a storage device 315, an I/O interface 320, and a communication interface 325. Furthermore, the computing device 300 can include an input device such as a touchscreen, mouse, keyboard, etc. In certain implementations, the computing device 300 can include fewer or more components than those shown in FIG. 3.

In particular implementations, processor(s) 305 includes hardware for executing instructions, such as those making up a computer program. As an example, and not by way of limitation, to execute instructions, processor(s) 305 may retrieve (or fetch) the instructions from an internal register, an internal cache, memory 310, or a storage device 315 and decode and execute them.

The computing device 300 includes memory 310, which is coupled to the processor(s) 305. The memory 310 may be used for storing data, metadata, and programs for execution by the processor(s). The memory 310 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 310 may be internal or distributed memory.

The computing device 300 includes a storage device 315 includes storage for storing data or instructions. As an example, and not by way of limitation, storage device 315 can comprise a non-transitory storage medium described above. The storage device 315 may include a hard disk drive (HDD), flash memory, a Universal Serial Bus (USB) drive or a combination of these or other storage devices.

The computing device 300 also includes one or more input or output ("I/O") devices/interfaces 320, which are provided to allow a user to provide input to (such as user strokes), receive output from, and otherwise transfer data to and from the computing device 300. These I/O devices/interfaces 320 may include a mouse, keypad or a keyboard, a touch screen, camera, optical scanner, network interface, modem, other known I/O devices or a combination of such I/O devices/interfaces 320. The touch screen may be activated with a writing device or a finger.

The I/O devices/interfaces 320 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 320 is configured to provide graphical data to a display for presentation to a user. The graphical data may be representative of one or more graphical user interfaces and/or any other graphical content as may serve a particular implementation.

The computing device 300 can further include a communication interface 325. The communication interface 325 can include hardware, software, or both. The communication interface 325 can provide one or more interfaces for communication (such as, for example, packet-based communication) between the computing device and one or more other computing devices 300 or one or more networks. As an example, and not by way of limitation, communication interface 325 may include a network interface controller (NIC) or network adapter for communicating with an Ethernet or other wire-based network or a wireless NIC (WNIC) or wireless adapter for communicating with a wireless network, such as a WI-FI. The computing device 300 can further include a bus 330. The bus 330 can comprise hardware, software, or both that couples components of computing device 300 to each other.

Figure 4:
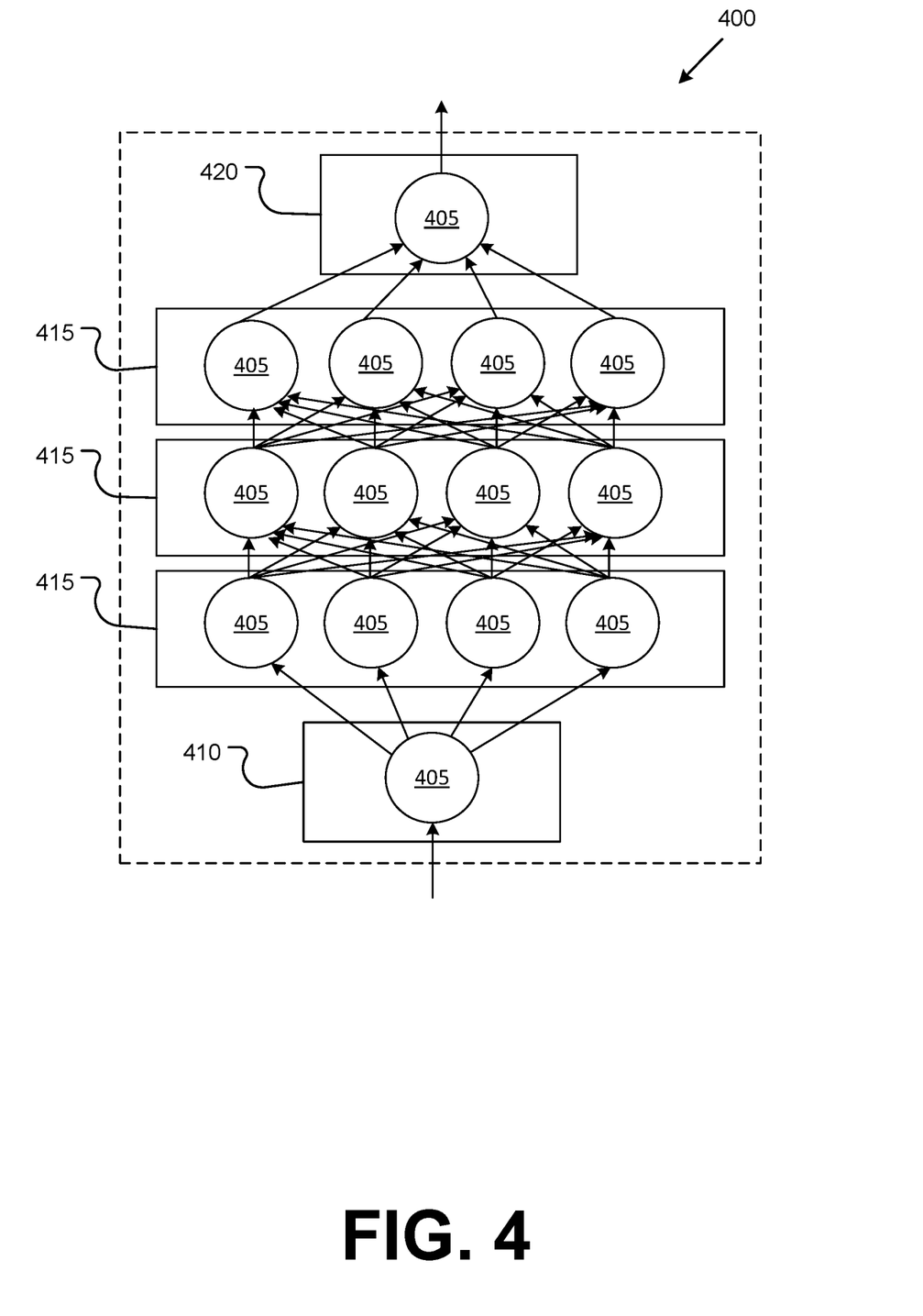
FIG. 4 is a diagram of an example neural network.

FIG. 4 is a diagram of an example deep neural network (DNN) 400 that may be used herein. The DNN 400 includes multiple nodes 405, and the nodes 405 are arranged so that the DNN 400 includes an input layer 410, one or more hidden layers 415, and an output layer 420. Each layer of the DNN 400 can include a plurality of nodes 405. While FIG. 4 illustrates three (3) hidden layers 415, it is understood that the DNN 400 can include additional or fewer hidden layers. The input and output layers 410, 420 may also include more than one (1) node 405.

The nodes 405 are sometimes referred to as artificial neurons, because they are designed to emulate biological, e.g., human, neurons. A set of inputs (represented by the arrows) to each node 405 are each multiplied by respective weights. The weighted inputs can then be summed in an input function to provide, possibly adjusted by a bias, a net input. The net input can then be provided to activation function, which in turn provides a connected node 405 an output. The activation function can be a variety of suitable functions, typically selected based on empirical analysis. As illustrated by the arrows in FIG. 4, node 405 outputs can then be provided for inclusion in a set of inputs to one or more neurons 405 in a next layer.

The DNN 400 can be trained to accept data as input and generate an output based on the input. In one example, the DNN 400 can be trained with ground truth data, i.e., data about a real-world condition or state. For instance, the DNN 400 can be trained with ground truth data or updated with additional data by a processor. Weights can be initialized by using a Gaussian distribution, for example, and a bias for each node 405 can be set to zero. Training the DNN 400 can including updating weights and biases via suitable techniques such as backpropagation with optimizations. Ground truth data can include, but is not limited to, data specifying objects within an image or data specifying a physical parameter, e.g., angle, speed, distance, color, hue, or angle of object relative to another object. For example, the ground truth data may be data representing objects and object labels.

Machine learning services, such as those based on Recurrent Neural Networks (RNNs), Convolutional Neural Networks (CNNs), Generative Adversarial Networks (GANs), Long Short-Term Memory (LSTM) neural networks, or Gated Recurrent Unit (GRUs) may be implemented using the DNNs 400 described in this disclosure.

Figure 6:
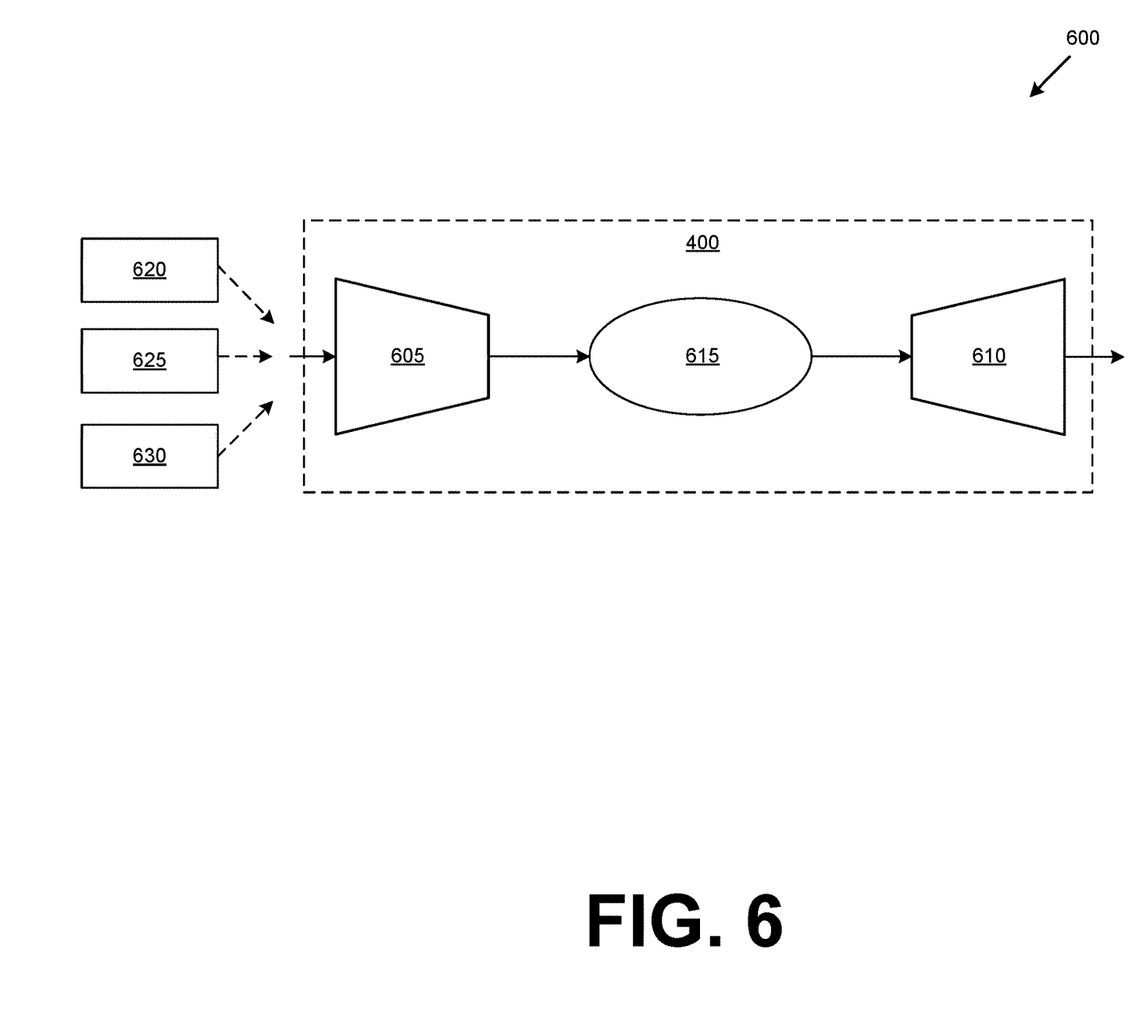
FIG. 6 is a block diagram illustrating the neural network arranged in an encoder-decoder architecture.

It is understood that the DNN 400 can comprise an encoder-decoder architecture (see FIG. 6). For example, the DNN 400 can include one or more encoders that generate an encoded representation of the received input. The encoded representation can be referred to a latent embedding layer in which one or more decoders that generate an estimated reconstruction of the data within the latent embedding layer.

Figure 5A:
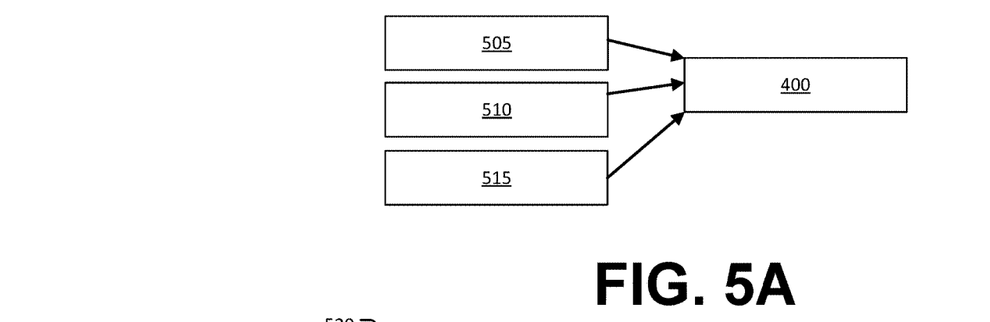
FIGS. 5A through 5C are block diagrams illustrating an example process for training one or more neural networks.
Figure 5B:
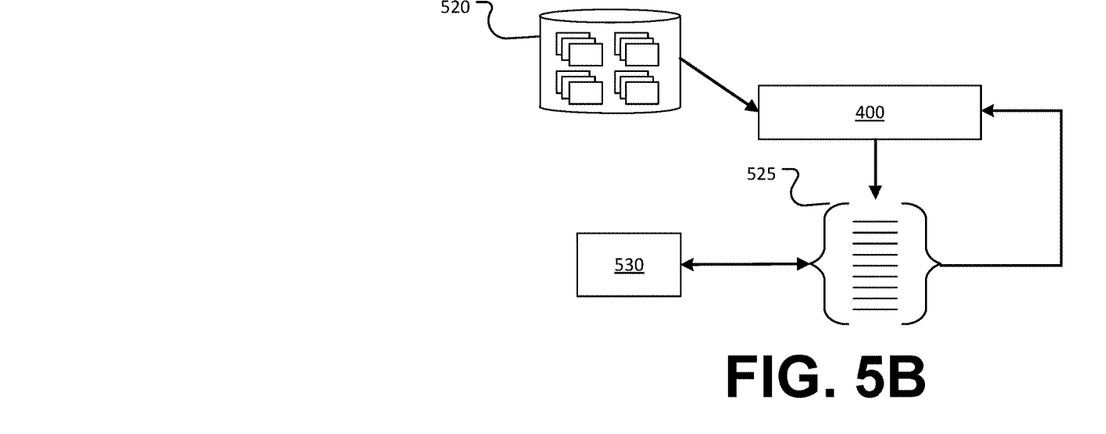

FIGS. 5A and 5B illustrate an example process for training the DNN 400 in accordance with one or more implementations of the present disclosure. As shown in FIG. 5A, during an initial training phase, a DNN 400 receives training data 505, training labels 510, and constraints 515, such as one or more of the data constraint, the feature constraint, or the intermediate concept constraint. The training data 505 can comprise images depicting objects within a field-of-view (FOV) of a vehicle sensor 115. The training labels 510 may comprise object labels, object type labels, domain type, and/or distance of the object with respect to the source of the image. The constraints 515 can comprise perturbed data, concept parameters, and/or physical parameters, such as sensor 115 physical parameters. It is contemplated that multiple types of constraints 515 can be used to train the DNN 400.

For example, a first constraint 515 can comprise perturbed data and a second constraint 515 can comprise concept parameters of the perturbed data. In this example, an image of a stop sign may be perturbed such that some DNNs would classify the object as a speed limit sign due to the perturbation. The perturbed data including the stop sign can be provided to the DNN 400 for training along with concept parameters that define concepts corresponding to the stop sign, such as a red color, octagon shape, etc.

After the initial training phase, at a supervised training phase, a set of N training data 520 is input to the DNN 400. The DNN 400 generates outputs translated data for each of the N training data 520 inputs. FIG. 6B illustrates an example of generating output based on training data 520, e.g., non-labeled training images, of the N training data 520. Based on the initial training, the DNN 400 outputs a vector representation 525 of the output data, e.g., latent representations of the training data. The vector representation 525 is compared to ground-truth data 530.

The DNN 400 updates network parameters based on the comparison to the ground-truth data 530, which can include intermediate concept constraints. For example, the network parameters, e.g., weights associated with the neurons, may be updated via backpropagation. The DNN 400 may be trained at the server 145 and provided to the vehicle 105 via the communication network 135. The vehicle 105 may also provide data captured by the vehicle 105 systems to the server 145 for further training purposes.

Figure 5C:
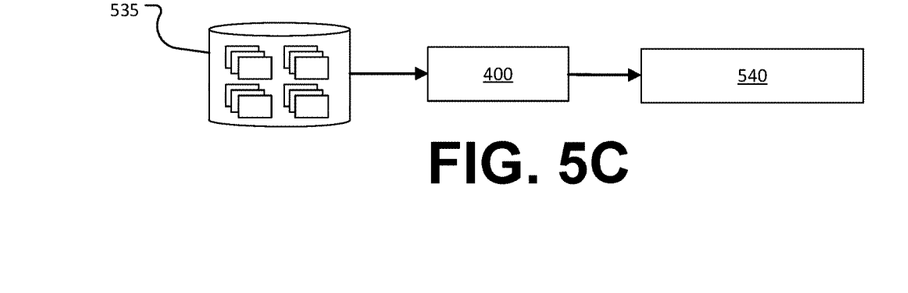

The process described can occur multiple times. For example, the process can continue until a desired accuracy is achieved or a desired loss convergence is achieved. Once trained, the DNN 400 can be provided to the vehicle 105. The computer 110 can employ the DNN 400 to perform object classification and/or object identification using images captured by the sensors 115. For example, as shown in FIG. 5C, sensor data 535 is received at the DNN 400. Based on the sensor data 535, the DNN 400 generates output 540 that can include, but is not limited to, object identification, object classification, and the like.

Using the object classification and/or object identification, the computer 110 may operate the vehicle based on one or more vehicle operation protocols, i.e., transitioning from an autonomous mode of operation to a semi-autonomous mode of operation, modifying a vehicle speed and/or vehicle direction, etc.

FIG. 6 illustrates an example environment 600 that includes the DNN 400. As shown, the DNN 400 comprises an encoder 605 and a decoder 610. In an example implementation, the latent encoder 605 comprises a variational autoencoders (VAE) neural network that receives one or more images as input and encodes the images into a latent representation space, e.g., latent features. The encoder 605 may be implemented as one or more hidden convolutional layers and a fully connected output layer. The hidden representation may be referred to as a latent representation or latent vectors 615.

The decoder 610 can receive the latent representation 615 and generate reconstructed images based on the latent representation 615. The decoder 610 may comprise a VAE decoder that includes a fully connected input layer and one or more hidden deconvolutional layers.

As shown, during the initial training phase, the DNN 400 is provided one or more of data constraint 620, a feature constraint 625, or an intermediate concept constraint 630 for training purposes. As discussed above, the training data for the data constraint 620, the feature constraint 625, and/or the intermediate concept constraint 630 can further include training data and training labels corresponding to perturbed data, concept parameters, and/or style parameters.

Figure 7:
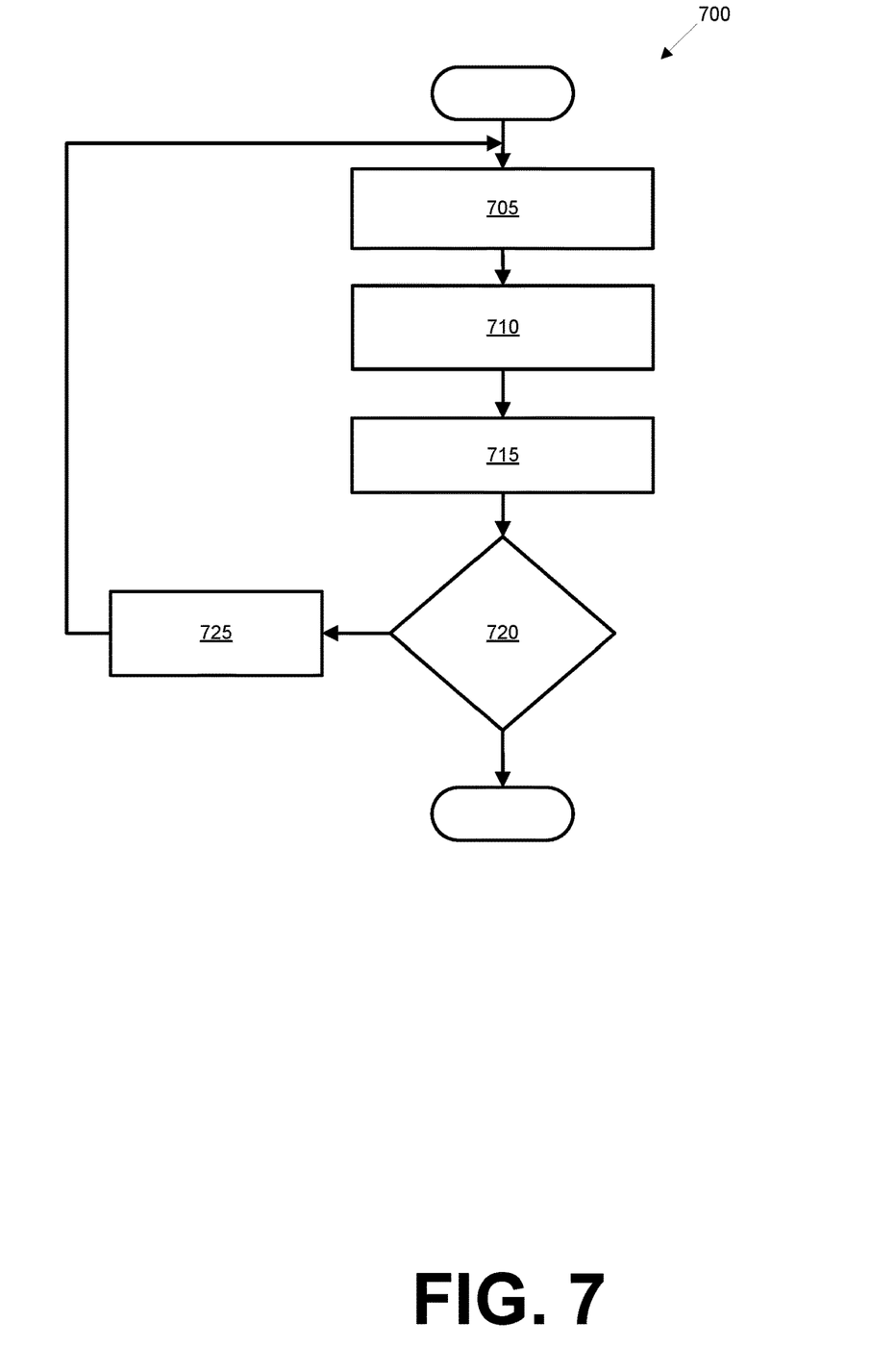
FIG. 7 is a flow diagram illustrating an example process for training a neural network.

FIG. 7 is a flowchart of an example process 700 for training a DNN 400 according to the techniques described herein. Blocks of the process 700 can be executed by the server 145. The process 700 begins at block 705 in which training data, training labels, and the data constraint, the feature constraint, and/or the intermediate concept constraint are received.

At block 710, the DNN 400 generates an encoded representation of the training data using the training labels. At block 715, the DNN 400 generates reconstructed data based on the encoded representation and the data constraint, the feature constraint, and/or the intermediate concept constraint. At block 720, a determination is made whether another a current epoch equals a predetermined epoch value. The predetermined epoch value can comprise the number of iterations the DNN 400 trains using the training data, training labels, and intermediate concept constraints. If the current epoch equals the predetermined epoch value, the process 700 ends. Otherwise, the current epoch is incremented at block 725, and the process 700 returns to block 725.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive a data constraint, a feature constraint, and an intermediate concept constraint at a neural network, wherein the data constraint includes a perturbed image of an object, the feature constraint includes a physical property of a vehicle sensor, and the intermediate concept constraint is based on human knowledge that provides additional context about a training data, the additional context comprising additional definitions and relationships pertaining to an object depicted within the training data; and
   train the neural network with the training data, training labels, and the data constraint, the feature constraint, and the intermediate concept constraint.

2. The system of claim 1, wherein the intermediate concept constraint further includes at least one concept parameter that defines an individual component and relational information pertaining to an object of interest.

3. The system of claim 1, wherein the feature constraint further comprises style parameters corresponding to the input data.

4. The system of claim 3, wherein the feature constraint further comprises intrinsic image parameters corresponding to sensor data and extrinsic image parameters corresponding to the sensor data.

5. The system of claim 1, wherein the processor is further programmed to receive the training data and the training labels.

6. The system of claim 1, wherein the training data comprises images depicting the object within a field-of-view of the vehicle sensor.

7. The system of claim 1, wherein the neural network comprises a deep neural network.

8. The system of claim 7, wherein the deep neural network comprises at least one of a convolutional neural network or a generative adversarial neural network.

9. A method comprising:
   receiving a data constraint, a feature constraint, and an intermediate concept constraint at a neural network, wherein the data constraint includes a perturbed image of an object, the feature constraint includes a physical property of a vehicle sensor, and the intermediate concept constraint is based on human knowledge that provides additional context about a training data, the additional context comprising additional definitions and relationships pertaining to an object depicted within the training data; and
   training the neural network with the training data, training labels, and the data constraint, the feature constraint, and the intermediate concept constraint.

10. The method of claim 9, wherein the intermediate concept constraint further includes at least one concept parameter that defines an individual component and relational information pertaining to an object of interest.

11. The method of claim 9, wherein the feature constraint further comprises style parameters corresponding to the input data.

12. The method of claim 11, wherein the feature constraint further comprises intrinsic image parameters corresponding to sensor data and extrinsic image parameters corresponding to the sensor data.

13. The method of claim 9, further comprising receiving the training data and the training labels.

14. The method of claim 9, wherein the training data comprises images depicting the object within a field-of-view of the vehicle sensor.

15. The method of claim 9, wherein the neural network comprises a deep neural network.

16. The method of claim 15, wherein the deep neural network comprises at least one of a convolutional neural network or a generative adversarial neural network.

* * * * *